June 6, 1967   A. O. ADAMS   3,324,268
INTEGRAL PRELOADED CONTACT STRUCTURE
Filed Sept. 30, 1965   3 Sheets-Sheet 1

INVENTOR.
ANDREW O. ADAMS
BY
Christie, Parker & Hale
ATTORNEYS.

INVENTOR.
ANDREW O. ADAMS
BY
Christie, Parker & Hale
ATTORNEYS.

June 6, 1967            A. O. ADAMS            3,324,268

INTEGRAL PRELOADED CONTACT STRUCTURE

Filed Sept. 30, 1965            3 Sheets-Sheet 3

INVENTOR.
ANDREW O. ADAMS
BY
Christie, Parker & Hale
ATTORNEYS.

United States Patent Office 3,324,268
Patented June 6, 1967

3,324,268
INTEGRAL PRELOADED CONTACT STRUCTURE
Andrew O. Adams, Inglewood, Calif., assignor to Leach Corporation, San Marino, Calif., a corporation of Delaware
Filed Sept. 30, 1965, Ser. No. 491,656
17 Claims. (Cl. 200—166)

This invention relates in general to relay contact structures and more particularly relates to a new and improved relay contact wherein one integral piece serves as a contact surface, a conductor, a spring, and in alternative embodiments, as pressure points for preloading the spring.

Today's modern aircraft and other comparable uses have dictated that relays be extremely vibration and shock resistant. In addition, modern rocketry has required relays which are subjected to vibrations and shocks of magnitudes heretofore unknown. As a result of these increased requirements, many prior art relays do not meet today's rigid standards of frequency, vibration and shock resistance. This invention provides a relay which has a new and improved contact structure that is highly shock and vibration resistant; and which provides a minimum number of parts thus providing increased efficiency, longer wear life and simplified fabrication techniques.

Prior art relays in general have been extremely vibration sensitive because the contact structure, and in particular the movable contacts, are generally mounted on a rod by way of oversized holes and compression springs. These oversized holes and compression springs in the prior art relays develop what is commonly referred to in the relay art as "overtravel" or a "preload" condition. This overtravel as it is called, is a way of suddenly applying contact pressure of a desired amount rather than having the pressure between the moving and stationary contacts applied gradually in a linear relationship over an extended contact closure time.

Prior art "overtravel" arrangements in general have included a straight flat bar of high electrical conductivity material as a movable contact. This bar at its center has an oversized hole that is loosely fitted over a post mounted in an insulated bracket. A shoulder on the insulated bracket receives the movable contact bar and is held in that position by a spring dropped over the post and held in compression between the surface of the contact bar and a spring keeper fastened at the end of the post. In turn the insulated mounting also includes an oversized hole and is spring loaded, in a manner similar to that just described, on a support rod which is generally a solenoid operated rod or a rod that is hinged and rotated by energization of a relay coil. This prior art assembly thus includes numerous springs, bars, spring keepers and costly insulated brackets of very complex shapes. In addition, the prior art relays normally required several of these contact assemblies mounted on one support rod and all of these assemblies required similar shaped insulated brackets which were separated from the preceding bracket by additional springs or spacer materials.

The oversized holes and springs required in the prior art to develop the overtravel mentioned above, result in a loose fitting assembly. This loose fitting assembly is highly disadvantageous because it is subject to considerable vibration. This vibration, which is characteristic of most prior art relays, causes extreme wear on all of the loose fitting parts with the end result that either the prior art relays fail to initially meet the rigid standards of today's technology, or that they deteriorate in quality rapidly to a point where they are no longer acceptable for today's rigid frequency, vibration, and shock requirements.

Another disadvantage of the foregoing prior art relay assemblies is that constant vibration and wear of the loose fitting assemblies jar loose small particles of metal and insulating materials. These particles often render the relay useless because they block, or jam, the mechanical linkages which provide movements for the contacts. Such particles also can seriously interfere with the electrical circuits within the relay itself.

The foregoing disadvantages of the prior art are eliminated in accordance with the principles of this invention by a relay structure which is highly resistant to vibration and shock by eliminating any necessity of separate conductors, contacts, springs, numerous complex shaped parts, rods and insulator supports, all of which are characteristic of the prior art relays. The relay structure of this invention includes a spring loaded conductor that is flat and serves as movable relay contacts. The contacts, conductor, spring, and in certain embodiments the fulcrum points as well, are all one integral piece, thus eliminating oversized holes and loose fitting parts which contribute to the extreme vibration sensitivity of prior art relays.

In accordance with the principles of this invention the integral unit contact structure of our new and improved relay includes a flat elongated bar of mechanical elasticity and high electrical conductivity which has a pair of contact surfaces that are located one each at opposite ends and on opposite sides of the bar. The flat bar is bifolded to an S-shape having both contact surfaces extending beyond the bifolded portion, which portion is secured at its midpoint, and combines with pressure producing means to form a pair of recurved cantilevered preloaded springs for both contacts which achieve the overtravel objectives mentioned hereinbefore. In one embodiment of this invention an insulated bracket has two raised pressure points for spring loading the integral unit contact-conductor-spring bar when the bar is secured to the bracket.

In another embodiment of this invention, the insulated bracket is simpler in design and does not include any pressure points. Instead, spring preloading is provided by bent extensions of the midpoint section of the integral contact unit of this invention. The new and improved integral contact structure and insulated bracket of this invention are combined into a relay by securely fixing them to a flat armature plate which is pivotably mounted at the center points of opposed ends by a pair of opposed mounting posts. Stationary contacts are housed in a base support and are spaced apart and immediately in line with the contact surfaces when the relay is normally de-energized. Means, such as a relay coil, is selectively operative for pivotably rotating the armature until the contacts are touching. This selectively operative means further rotates the armature another predetermined amount with the movable contacts held against the stationary contacts until the flat bar is moved away from the pressure points. Thereafter when the relay coil is de-energized, the armature plate releases and returns to its initial position. As is sometimes the case during the interval when the contacts are touching, high current through these contacts creates a temporary weld or fusion. In accordance with the principles of this invention, the raised pressure points, upon de-energization of the coil, strike the contact bar surfaces with a hammer-like blow which assures a proper and immediate separation of the movable and fixed contact surfaces.

The foregoing features and principles of this invention may more readily be understood by reference to the accompanying drawing in which.

Figure 1:
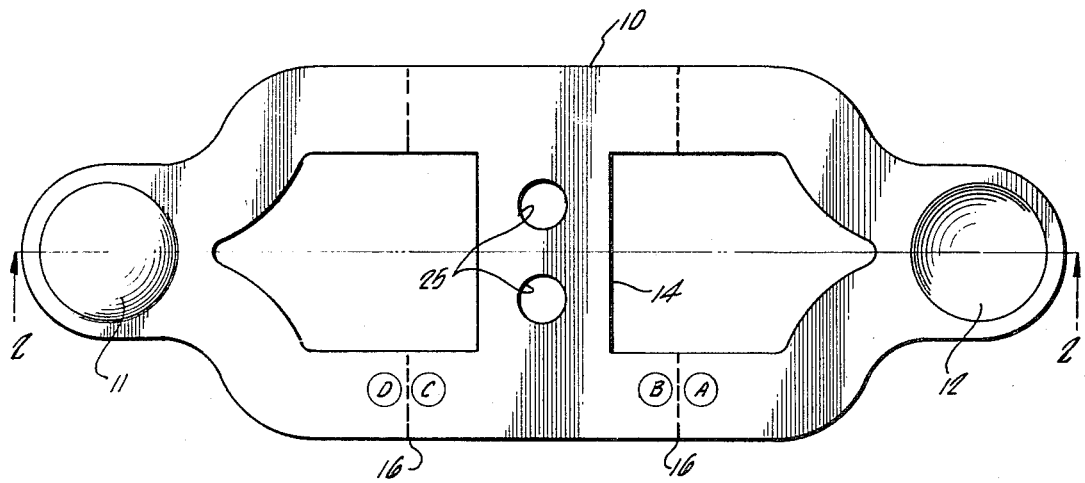
FIG. 1 depicts one embodiment of the unfolded contact structure of this invention in a plan view.

In FIG. 1 a flat elongated bar 10 of high electrical conductivity material is depicted, having at opposite ends a pair of contact surfaces 11 and 12 which surfaces may be convex and concave, respectively. Two openings are cut in conductive bar 10 on opposite sides of a center post section 14. The openings in conductive bar 10 are chosen sufficiently large to provide for two equal area current conducting paths of any desired value between the contacting surfaces 11 and 12. These openings are also available to receive an insulated mounting bracket for bar 10 when it is bifolded along the dashed lines 16.

Figure 2:
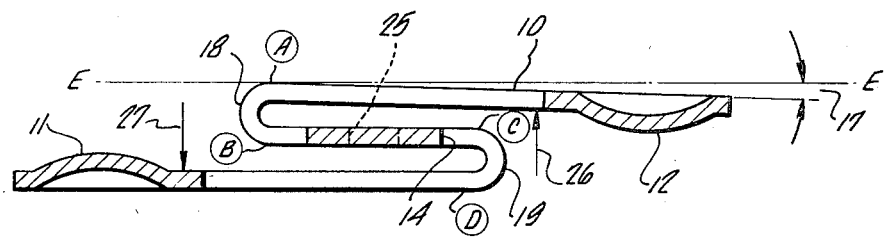
FIG. 2 depicts the bifolded contact structure of FIG. 1 taken along line 2—2 of FIG. 1.

FIG. 2, which is taken along the line 2—2 of FIG. 1 in the direction shown by the arrows, is the bar 10 after it has been folded twice at the dashed lines 16 of FIG. 1 into a substantially flat S-shape. This S-shape is accomplished by folding in the manner designated by the circled letters A, B, C and D which appear in FIGS. 1 and 2. When folded in the S-shape shown, the flat center post 14 becomes a midpoint surface area that is secured by any suitable means to an insulator block such as that shown in FIG. 3. This flat area 14 defines a fixed, or fulcrum, area for two recurved cantilever springs which are the upper and lower double-return bends 18 and 19 respectively, of the S-shaped conductive bar 10.

The principles of this invention are applicable to low as well as to high current rated relays, and thus bar 10 is chosen from any suitable high conductivity material. In addition, it is necessary that the cross-sectional area of the entire bar 10 be suitable to carry the relay's rated current without significant voltage drop across the contacts 11 and 12 and at the same time exhibit suitable mechanical elasticity after it is once formed into an S-shape. Numerous materials are available from which the S-shaped conductor 10 may be formed. One such high conductivity material, for example, may be an alloy of silver, magnesium, and nickel of the type known as Handy and Harman Alloy 995 having a nominal composition of 99.4% Ag, .25% Ni, and .25% Mg. This particular alloy, and others of similar composition, have proved particularly applicable for the integral contact unit of this invention, but are not to be taken as limiting the principles or scope of this invention. A material such as Alloy 995, as well known, is initially available in a hard-rolled condition. In this hard-rolled condition, the alloy may be fabricated into any desired shape. For example, the holes and contact depressions of FIG. 1 may be stamped into a blank of Alloy 995 and the double-return bends 18 and 19 depicted in FIG. 2 placed in the blank by well known shaping and forming operations. It should also be understood of course that the conductive bar 10 could be of a different material than contacts 11 and 12 without departing from the principles of this invention. In this latter case, contact surfaces 11 and 12 could be secured to conductive bar 10 by any suitable means such as soldering, welding, etc.

After its fabrication into the desired S-shape, the conductive bar 10 may be permanently hardened in bifolded shape by a simple internal oxidation treatment that converts the magnesium of Alloy 995, which is normally in solid solution in the silver, into a magnesium oxide. When the S-shaped bar 10 has been oxidized in this fashion it exhibits a mechanical flexibility such that it will repeatedly recover its original S-shape when released after distortion. This particular alloy, and similar composition materials, are not susceptible to crystallization and they retain their tensile strength over long periods of time, thus assuring a long wear life for the relay contact units of this invention.

During the shaping and forming operation described above in connection with FIG. 2, it should be noted that bar 10 may be subjected to what is commonly referred to as a slight "overforming." This overforming refers to the fact that the upper parallel part of conductive bar 10 is hardened at an angular plane slightly below a true horizontal plane as depicted by line E—E. This slight angular departure from the true horizontal line, such as arc 17, is chosen to provide a spring bias at the flexure bend areas 18 and 19 of the upper and lower portions of the S-shaped bar 10 when the bar is preloaded by pressure producing points acting at arrows 26 and 27.

Figure 3:
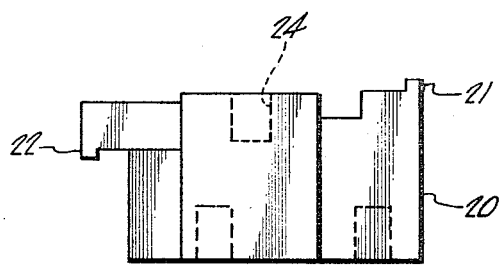
FIG. 3 depicts an insulated bracket having opposed pressure producing points.

FIG. 3 depicts an insulator block 20 which has at its upper surface two preload pressure points 21 and 22 which extend in opposite directions. This insulator bracket 20 may be any well-known insulating material. For example, it may be a glass bonded mica or it may be a material such as bakelite that is compressed to the shape shown in FIG. 3 and is thereafter subjected to a thermal setting operation so that it will retain its former shape, even if reheated. A pair of threaded openings 24 are present in the top of the insulator bracket for receiving appropriately threaded screws which are inserted through the matched pair of openings 25 in the center post 14 of bar 10, FIG. 1. Each of the oppositely extending and raised preload pressure points 21 and 22 bear against the upper and lower recurved cantilever springs of the S-shaped bar 10 at the spots and with the forces depicted by arrows 26 and 27, FIG. 2. These points 21 and 22 serve to preload the contact when the unit is mounted on insulated bracket 20 at its fixed midpoint area 14 by screws 58 as shown in detail in FIG. 5.

Figure 5:
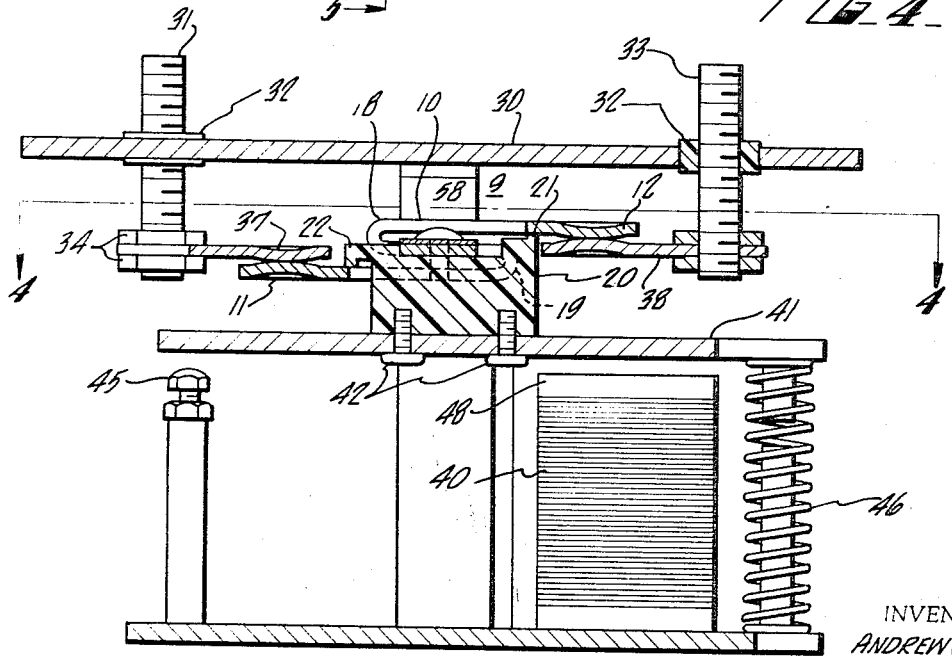
FIG. 5 is a side elevation sectional view of the embodiment shown in FIG. 4 of a relay including the contact structure in accordance with the principles of this invention.

FIG. 5 depicts a relay assembly which includes the integral contact unit of this invention, shown in a new and improved cooperative relationship with certain other relay components. In FIG. 5 a top plate 30 defines the upper surface of a relay container which houses in insulating rings a plurality of terminals, of which two terminals 31 and 33 are shown. Each terminal is a high conductivity material that is insulated from the metal surface of the container 30 by a glass insulating and sealing material 32. This insulating material 32 forms an airtight seal between post 31 and the upper container 30 so that the entire relay once assembled and sealed in an upper container 30 and a lower container (not shown) may be pressurized at any necessary amount. Terminal 31 includes fastening means such as nuts 34 within the relay structure which have a stationary contact bar 37 sandwiched in compression between opposing surfaces. Mounting post 33 is similarly adapted to hold a second stationary contact bar 38. When the relay of FIG. 5 is in a de-energized position, its contacts are normally open with contact surfaces 11 and 12 spaced apart from the stationary contacts 37 and 38, respectively, although it is obvious that the relay assembly could also serve as a normally closed relay.

Figure 4:
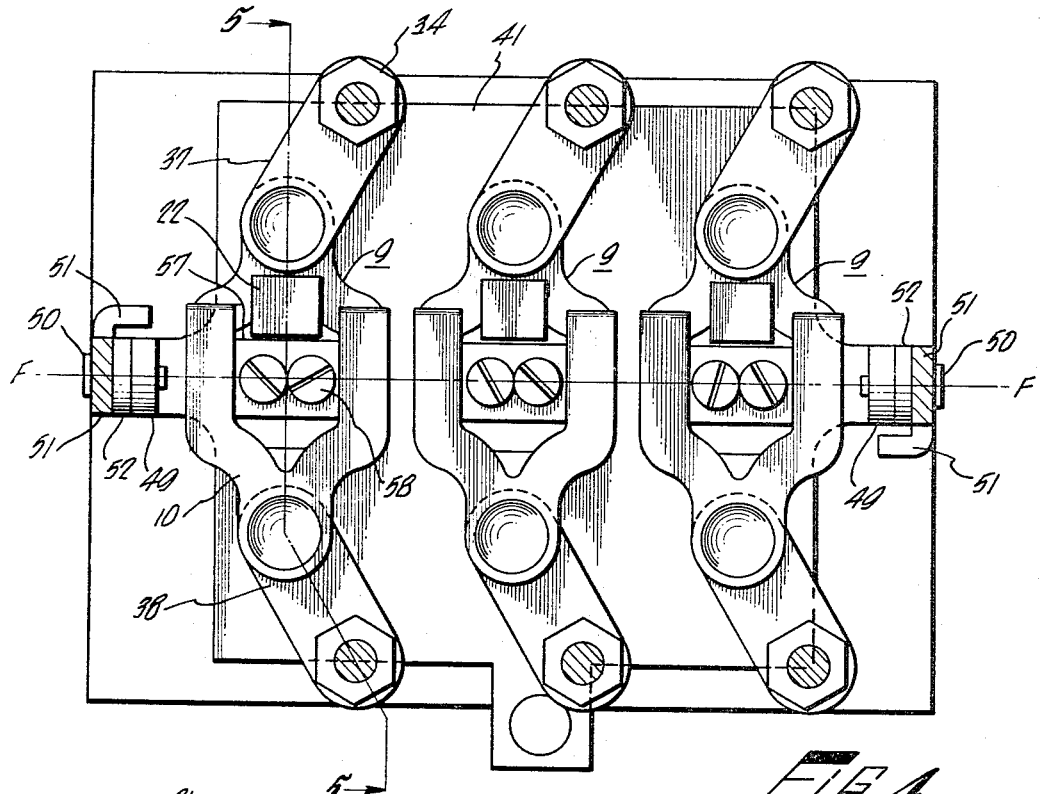
FIG. 4 is a top view of three contact units mounted on an armature plate taken along line 4—4 of FIG. 5, in accordance with the principles of this invention.

FIG. 4 is a top view of the relay of FIG. 5 taken along line 4—4 of FIG. 5. Three separate integral contact units 9 of this invention are depicted mounted on an armature plate 41. This armature plate 41 is a balanced armature in that substantially equal distribution of mass and components are placed on opposite sides of a center pivot axis F—F. Two upwardly extending hinge tabs 49 are formed at opposed sides of armature plate 41, and are bored to receive two pivot pins 50. Pivot pins 50, each pass through an upright mounting post 51 and a spacer 52 prior to being housed as pivot bearings in hinge tabs 49. Axis F—F is chosen to coincide at the center of gravity of the armature plate 41 and the contact units 9 further provide for greater resistance to any unwanted pivotal rotation of armature 41, at instants of extreme shock and vibration.

Reference to the position of armature 41 as shown in FIG. 5 discloses that the normal compressive force of spring 46 has been overcome by the selective energization of relay coils 40. At this depicted position armature 41 has pivoted in a clockwise direction about pivot pins 50, FIG. 4, until its bottom surface has moved away from stop 45.

Application of energizing current to coil 40, as is well known, attracts the armature plate 41 which is made of a magnetic material. This attractive force of coil 40 overcomes the normal compressive loading of spring 46 and pivots armature 41 until it rests at the end of its clockwise rotation, firmly on the top surface 48 of relay coil 40. With armature 41 substantially horizontal, as shown in FIG. 5, the movable contacts 11 and 12 are just touching the stationary contacts 37 and 39. At this instant pressure points 21 and 22 of bracket 20 are creating a preload spring tension at flexure areas 18 and 19 respectively of the upper and lower contact lever arms of S-shaped bar 10. When armature 41 is fully attracted to the top surface 48 of coil 40 the pressure points 21 and 22 of bracket 20 are spaced away from the recurved cantilever springs which include contacts 11 and 12. Thus contacts 11 and 12 are immediately forced against stationary contacts 37 and 38 with a pressure force determined by the flexure areas 18, 19 and the accompanying preload condition of the recurved and initially slightly overformed cantilever springs.

This contact pressure, as it is commonly referred to, varies in accordance with the particular current capacity of the relay, and may be in the order of one-half pound for a relay rated at 50 amperes.

When the contact pairs 11, 37 and 12, 38 are touching with proper contact pressure, a current carrying path is completed between terminal 31 and terminal 33. This path includes the stationary contacts 37 and 38 and the S-shaped conductive bar 10. Thus, in accordance with the principles of this invention, the movable contact surfaces 11 and 12, the current carrying conductor 10, and the springs defined by the recurved cantilever portions of the folded S-shape contact are all one integral contact unit 9. This contact unit 9 is securely mounted to an insulator bracket 20 which bracket is in turn securely mounted to a pivotable armature plate 41 by screws 42, FIG. 5. The contact unit of this invention thus provides for preloading without introducing numerous loose fitting, oversized parts subject to wear, shock and vibration.

A further advantage of the contact structure of this invention is readily apparent by reference to what is referred to in the art as contact weld or contact fusion. Relays of the type depicted in FIG. 5 are often required to carry approximately 50 to 100 or more amperes of current. At such high current levels the points of contact between the movable and stationary contacts tend to fuse or weld together. This temporary weld must be broken sharply when the relay is de-energized for proper current control operation. As defined earlier, when these contacts are closed and have completed a current carrying circuit, the pressure points 21 and 22 are not touching the conductive bar 10 but rather are spaced away from the conductor a predetermined amount as determined by the overtravel distance between the bottom of armature plate 41 and top surface 48 of coil 40. Upon de-energization of the relay coil 40, armature plate 41 is released and the return spring 46 forces the armature plate 41 to pivot about its pivot pins 50, FIG. 4. The armature plate 41 pivots counter-clockwise until it hits stop 45 shown at the left of FIG. 4. At the instant when armature plate 41, after de-energizaion, returns to its horizontal position shown in FIG. 4, the pressure points 21 and 22 strike the upper and lower recurved cantilever spring surfaces of conductor 10 with a sharp hammer-like blow. The resulting sharp blows by pressure points 21 and 22 provides assurance that any temporary fusion between the movable and stationary contact pairs 11, 37 and 12, 38 is cleanly and positively broken, thereby assuring proper current control by the relay of this invention.

Figure 6:
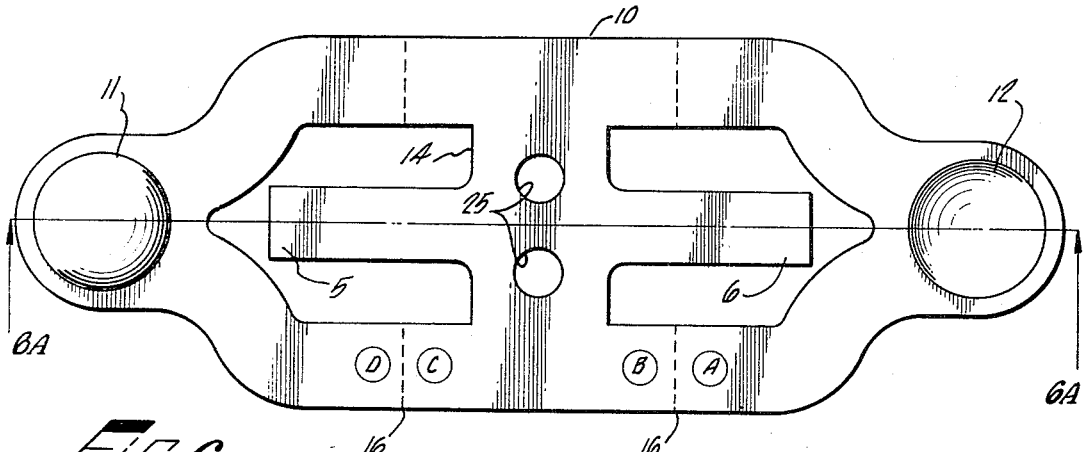
FIGS. 6 and 6A, 7 and 7A, depict alternative embodiments for the unfolded and bifolded contact structure of this invention.

FIG. 6 depicts the contact unit of this invention in an alternative embodiment wherein the flat unfolded conductor 10 and contact surfaces 11 and 12 are shown in plan view. This alternative shape for the integral contact bar of this invention differs from the contact bar of FIG. 1 in that two oppostiely directed elongations 5 and 6 extend from the midpoint area 14 toward the contacts 11 and 12. These extensions are a portion of the conductive material itself, and as shown in FIG. 6A, serve as the pressure points which previously were raised surfaces on the insulator bracket 20.

Figure 6A:
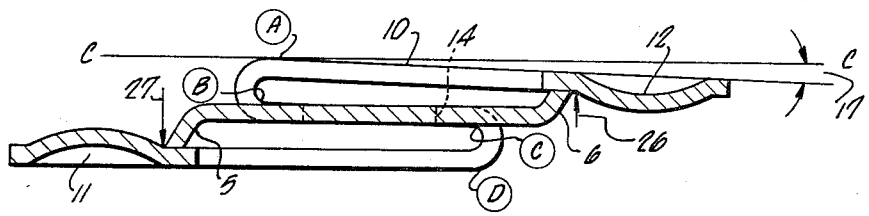

In FIG. 6A the conductor 10 of the contact unit of this invention has been shown in side elevation bifolded into a flat S-shape as described hereinbefore. The shaping operation for the contact of FIG. 6A includes the extension 6 which is curved into an upward arc as a pressure point for the upper recurved cantilever spring at the spot indicated by arrow 26. In a similar manner elongation 5 is bent in a downward curved arc to apply pressure against the lower recurved cantilever spring at pressure point indicated at arrow 27. This embodiment thus provides one integral contact unit in which the contact surfaces 11 and 12, the conductivebar 10, a pair of recurved cantilever springs, and the pressure producing means 5 and 6 for preloading these cantilever springs are all formed as one integral unit. This new and improved contact structure avoids the foregoing disadvantages of the prior art in that there are no moving parts, springs, oversized holes, etc., which are characteristic of the vibration-sensitive prior art relays.

Figure 7:
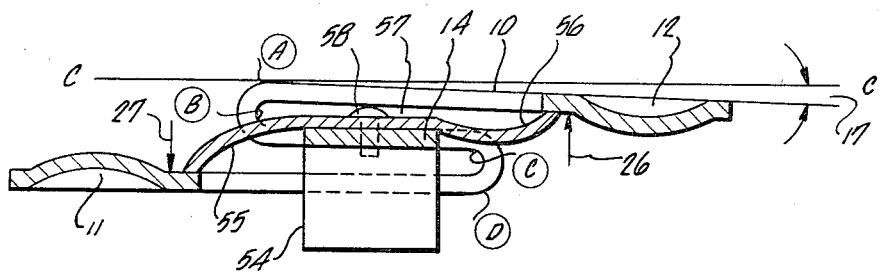
Figure 7A:
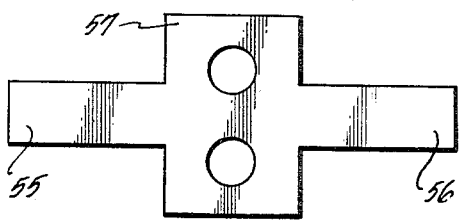

FIG. 7 depicts a side elevation of a conductor 10 and contact surfaces 11 and 12 which are initially shaped with a center post area 14 identical with that shown in FIG. 1. In FIG. 7, however, the insulator bracket 55 is substantially rectangular and thus is of a less complex shape than is insulator bracket 20 of FIG. 3. Insulator bracket 54 in FIG. 7 does not include the pressure points 21 and 22 of bracket 20. Rather, pressure points 55 and 56 are curved extensions similar to extensions 5 and 6 in FIG. 6, which extensions are stamped from the washer plate 57 which is positioned between fixed area 14 of the S-shaped contact unit and the heads of a pair of screws 58. This bracket 57 in its flat uncurved condition is shown in FIG. 7A.

It is obvious that either of the alternative embodiments shown in FIGS. 6, 6A and 7, 7A with their associated simplified form of insulated bracket 54, may be mounted on the armature plate 41 in FIG. 5 by set screws 42, for a relay operation identical to that described for the integral contact unit 9 of FIG. 5.

It is to be understood that the foregoing features and principles of this invention are merely descriptive, and that many departures and variations thereof are possible by those skilled in the art, without departing from the spirit and scope of this invention.

What is claimed is:

1. A contact structure comprising a first pair of contact surfaces at opposite ends of a folded S-shaped conductor, a support plate, means securely fixing the center point of the conductor to the support plate for forming upper and lower recurved cantilever springs each including one of said contact surfaces, and pressure points on said support bearing against said cantilever springs when said center point is securely fixed in place for preloading said springs to a predetermined contact pressure.

2. A contact structure as defined in claim 1 and further comprising a second pair of contact surfaces fixed at a spaced in-line relationship with said first contact surface pairs, and means selectively energizable and associated with said support plate for moving said first contact pair into contact with said second fixed pair of contact surfaces.

3. A contact structure as defined in claim 2 wherein said selectively energizable means overtravels the point of contact until said upper and lower cantilever springs are unseated from said pressure points on said support plate.

4. A contact structure as defined in claim 3 and further comprising a pair of terminals connected to said fixed contacts, for carrying current through said contact pairs and said S-shaped conductor when said means for moving said support plate is energized, and means for enhancing contact separation from temporary current-induced fusion between the contact surfaces upon de-energization of said moving means, said contact separating means including said pressure points for striking a sharp blow against said recurved cantilever springs.

5. A preloaded relay contact comprising a flat elongated bar having a pair of contact surfaces at opposite ends, a pair of openings in said bar one opening each located on opposite sides of a middle area and between the middle area and the contact surface, said bar being bifolded into a flexible double return bend, a support plate, means for securely fastening a common return point for both bends to the support plate, and pressure providing means for preloading both bends of the bifolded bar.

6. A preloaded relay contact in accordance with claim 5 wherein said means for preloading comprises a pair of oppositely extending elongations from said middle area, each elongation being bent to touch a return bend portion of said bar between the end and the bend in the bar.

7. A preloaded relay contact in accordance with claim 6 wherein said bar is an electrically conductive silver alloy material.

8. A preloatded relay contact in accordance with claim 7 wherein said silver alloy material consists of less than 1% nickel and less than 1% magnesium with the remaining composition being silver.

9. A preloaded relay contact in accordance with claim 5 wherein said fastening means includes a flat washer plate substantially equal in size to said middle area of said bar and further includes a pair of oppositely extending elongations, and wherein said pressure providing means for preloading both ends of the bifolded bar includes said elongations bent from said fastening position to touch said bar at a point removed from said bend.

10. A preloatded relay contact comprising a flat elongated bar having a pair of contact surfaces at opposite ends, a pair of openings in said bar one opening each located on opposite sides of a middle area and between the middle area and a contact surface, a pair of ospitely extending elongations from said middle area toward said contact surfaces, said bar being bifolded to a flat double return bend having a flexure area at each bend; a support plate; means securing the middle area to said support plate, said middle area when secured being a fixed fulcrum point; said bifolded bar forming a pair of cantilever springs each including said fulcrum point, a flexure area, and a contact surface; and pressure producing means comprising said elongations each bent to touch one of the cantilever springs near the contact surface areas for preloading both cantilever springs.

11. A relay having a movable contact structure comprising a conductive contact material shaped into a flexible double return bend, means for securely fastening a common return point for both bends to a support bracket, pressure providing means for preloading both bends of the contact structure; fixed contacts in said relay spaced apart from and in line with the ends of the movable contact material; and means pivotably rotating said support bracket for selectively completing a current path between said fixed and movable contacts.

12. A relay comprising a pair of stationary contacts; a pair of movable contacts, said movable contacts including as one integral unit a folded S-shaped conductor including said movable contacts at opposite ends thereof, said upper and lower portions of said folded conductor forming a pair of recurved cantilever springs, a pressure point on each cantilever spring; an insulated bracket; means securing the midpoint of said folded conductor to said bracket; means associated with said bracket to preload each of the cantilever springs to a predetermined contact pressure, such means bearing against the pressure points on the springs when the movable and stationary contacts are open; a pivotable armature plate; means fastening said bracket to said armature plate at a location normally spacing said movable contact pair apart from and in line with said stationary contact pair; and means selectively energizable for pivotably rotating said armature plate until said movable contacts touch said fixed contacts, such means being operable to release the preload means when the movable and fixed contacts touch thereby imparting the predetermined contact pressure immediately between the movable and fixed contacts.

13. A contact structure as defined in claim 12 wherein said preloading means includes a pair of oppositely extending elongations extending from the midpoint of the folded conductor, each elongation being in pressure contact with one of the pressure points of the spring at the predetermined contact pressure when the movable and fixed contacts are open.

14. A relay comprising:
at least one stationary contact;
a movable contact associated with each stationary contact, such movable contact including as one integral structure a contact surface, a recurved cantilever spring of electrically conductive material and a pressure point on the spring;
support means for the stationary and movable contacts;
means bearing on the pressure point preloading the spring of the movable contact to a predetermined contact pressure when the movable and stationary contacts are open; and
means associated with said support means for selectively making and breaking a circuit between the movable contact surface and the stationary contact, such means being operable to release the preload means when the movable and stationary contacts are closed and to impart the predetermined contact pressure between the movable and stationary contacts.

15. The relay claimed in claim 14 wherein the support means includes an insulated bracket and the recurved cantilever spring is secured to the insulated bracket at the spring's fulcrum point.

16. The relay claimed in claim 15 wherein the preloading means includes a plate mounted on the insulated bracket having an elongation extending from the insulated bracket, the elongation being in pressure contact with the pressure point of the spring at the predetermined contact pressure when the movable and stationary contacts are open.

17. The relay claimed in claim 14 wherein the movable contact is an electrically conductive silver alloy material.

References Cited

UNITED STATES PATENTS

| 2,187,379 | 1/1940 | Hensel et al. | 200—166 |
| 2,448,772 | 9/1948 | Clare et al. | |
| 2,749,403 | 6/1956 | Horman et al. | |
| 3,177,330 | 4/1965 | Lundberg | 200—166 |

FOREIGN PATENTS

| 555,341 | 3/1957 | Belgium. |

ROBERT K. SCHAEFER, *Primary Examiner.*

H. O. JONES, *Assistant Examiner.*